June 12, 1962 V. F. GUGLER 3,038,418
DOUGH TWISTING MACHINE
Filed Feb. 15, 1960 2 Sheets-Sheet 1
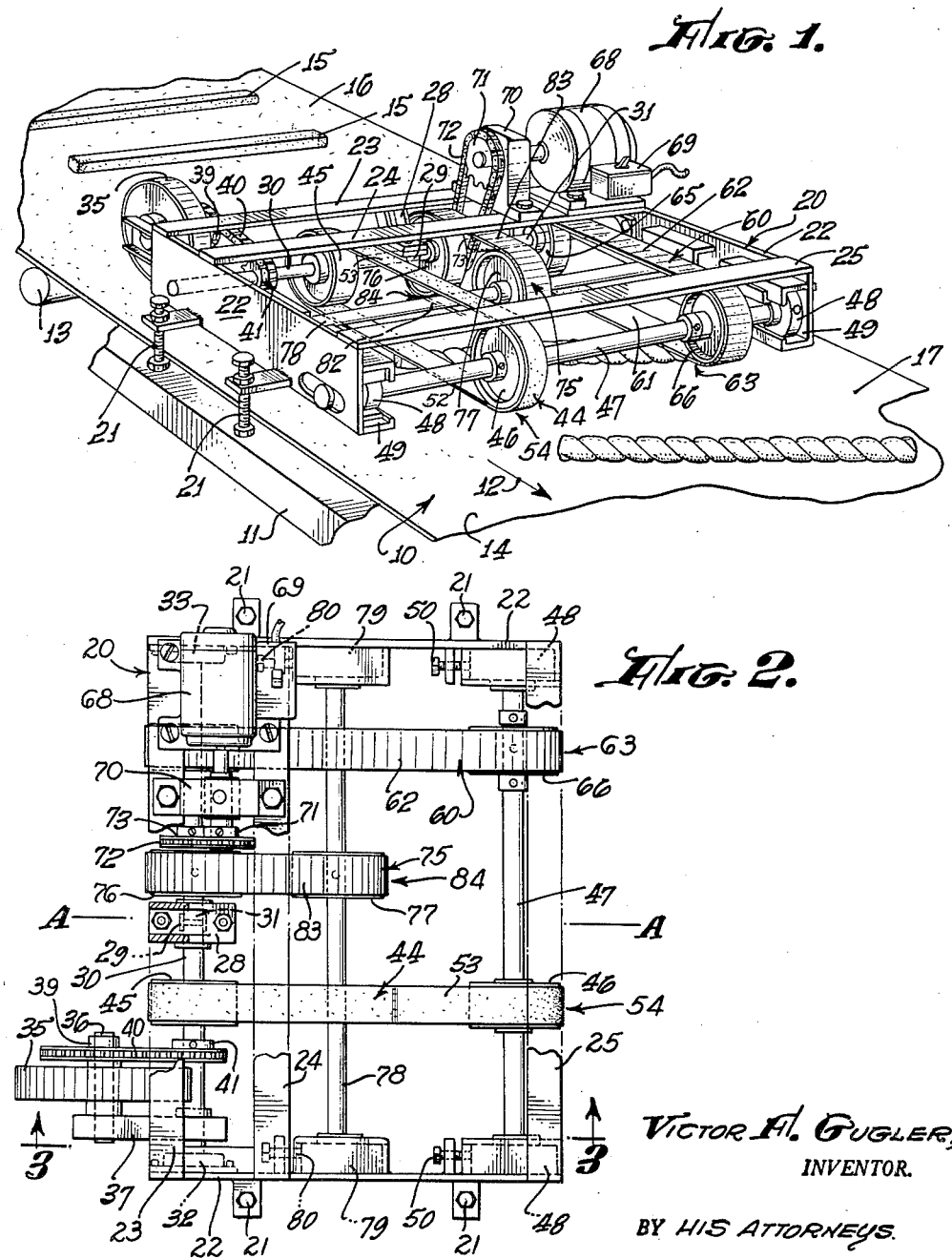
Victor F. Gugler,
INVENTOR.
BY HIS ATTORNEYS.
Harris, Kiech, Russell & Kern.

June 12, 1962  V. F. GUGLER  3,038,418
DOUGH TWISTING MACHINE
Filed Feb. 15, 1960  2 Sheets-Sheet 2
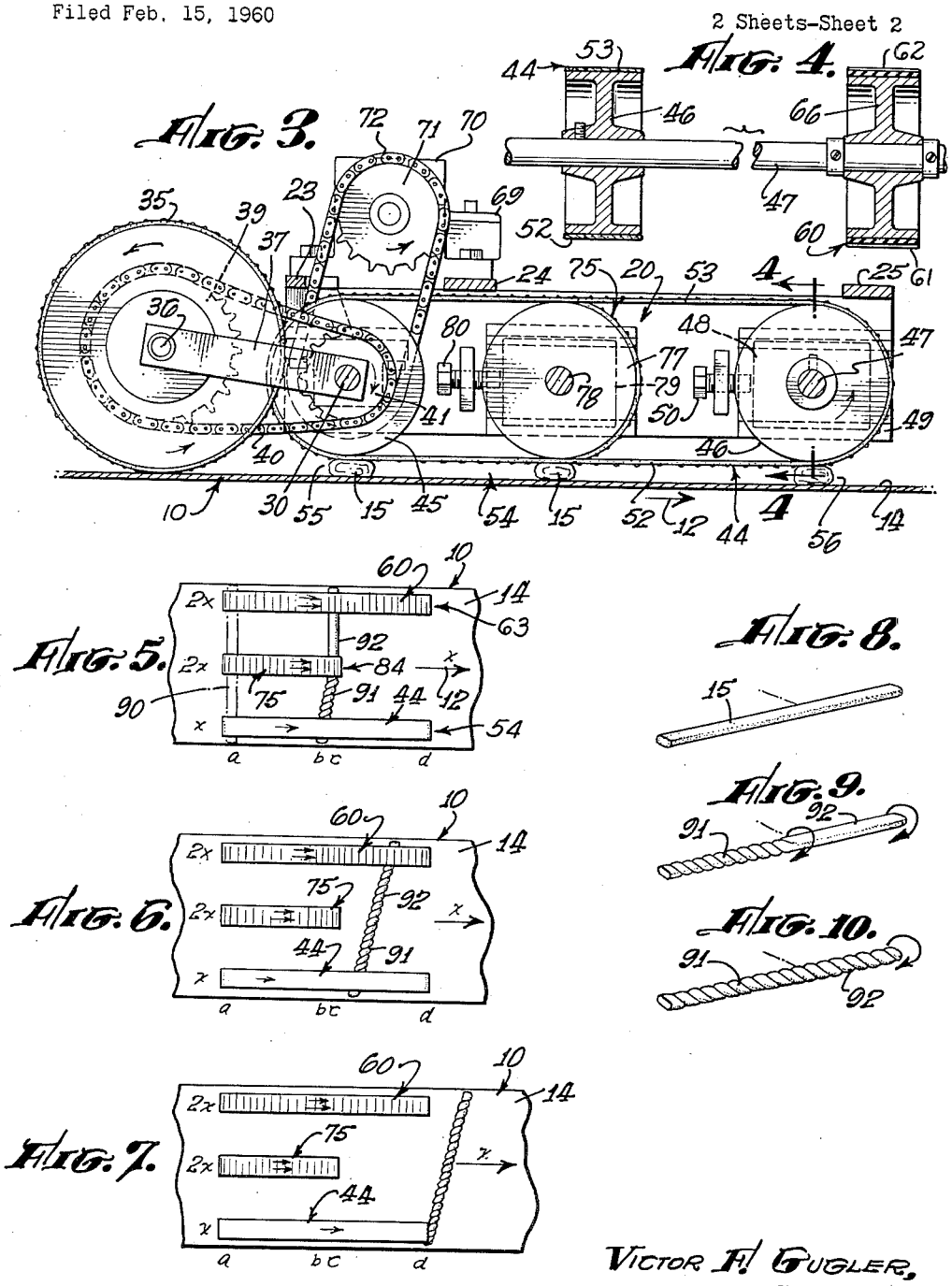
Victor F. Gugler,
INVENTOR.
BY HIS ATTORNEYS
Harris, Kiech, Russell & Kern

United States Patent Office 3,038,418
Patented June 12, 1962

3,038,418
DOUGH TWISTING MACHINE
Victor F. Gugler, 10423 Everest, Norwalk, Calif.
Filed Feb. 15, 1960, Ser. No. 8,602
16 Claims. (Cl. 107—8)

My invention relates to dough twisting machines for twisting lengths of dough in a bakery. It will be particularly exemplified as adapted to twist each of a succession of lengths of dough disposed laterally on a belt conveyor.

Various designs of dough twisting machines have been proposed for the purpose of twisting dough lengths preparatory to baking. Prior machines are complex, troublesome and often have a tendency to permit successive dough lengths to come into contact in a way tending to clog or foul the machine or produce non-uniform twisted products.

It is an object of the present invention to provide a dough twisting machine which is simple and foolproof yet which is capable of twisting dough lengths very rapidly and uniformly.

Another object of the invention is to provide a dough twisting machine in which a support surface of a conveyor advances in a forward direction and in which at least two endless belts are arranged with their forward runs disposed above the support surface and driven at different speeds. It is a further object of the invention to twist a length of dough while one segment thereof is held and advanced forwardly by a holding belt having its forward run advancing at a lineal speed substantially the same as that of said support surface. A further object is to drive another belt so that its forward run has a lineal speed substantially differing from that of said support surface to roll and twist another segment of the dough length as its end or first segment is held between the supporting surface and the holding belt.

In its preferred embodiment, the invention includes three belts each having a forward run advancing in a forward direction above the support surface. It is an object of the invention to drive at least two of such belts at different speeds and preferably to drive one of the three belts at a lineal speed substantially equal to that of the support surface and to drive at least one of the remaining belts at a lineal speed different from that of the support surface.

Each forward run provides a dough-receiving space which either holds or twists its corresponding segment of a dough length. It is an object of the present invention to provide dough-receiving spaces of different lengths. In the preferred embodiment it is an object to provide a central dough-receiving space shorter in length than the dough-receiving spaces on either side thereof.

In twisting short dough lengths it is sometimes possible to use two belts the forward runs of which respectively provide dough-holding and dough-twisting spaces. In this event the dough length is twisted uniformly throughout its length if its ends are received by such spaces. With longer dough lengths however the use of two belts has often proved impractical because the dough may tend to twist more in one section of its length than in another section. In such instances the invention contemplates the use of three belts so arranged that the two halves of the dough length are individually twisted. In the preferred arrangement these halves are twisted in sequence. It is an object of the invention to provide a dough twisting machine operating in these manners.

Further objects and advantages of the invention will be evident to those skilled in the art from the following description of a preferred embodiment.

Referring to the drawings:
FIG. 1 is a perspective view of the dough twisting machine;
FIG. 2 is a top view of the dough twisting machine;
FIG. 3 is a vertical view, partially in section, taken along the line 3—3 of FIG. 2;
FIG. 4 is a sectional view taken along the line 4—4 of FIG. 3;
FIGS. 5, 6 and 7 are diagrammatic views illustrating the operation of the device; and
FIGS. 8, 9 and 10 are sequence views showing the manner of twisting a dough length.

Referring particularly to FIGS. 1–3 a conveyor 10, illustrated as of the belt type, is advanced relative to a track 11 in a forward direction, indicated by the arrow 12, by any suitable advancing means indicated diagrammatically at 13 but usually representing an electric drive for one of the two broad pulleys encircled by the belt conveyor as is well known. The conveyor provides a support surface 14 moving in such forward direction. Lengths of dough 15 are placed manually or by machine on the conveyor in spaced relationship in a dough-receiving area 16 and are carried through the twisting area to a processed-dough area 17 therebeyond, whence they are removed and looped into desired form preparatory to baking. The dough lengths can be cut from a dough sheet or otherwise formed. They can be roughly square or rectangular in cross-section.

A frame 20 is mounted above the support surface 14 by bolts 21 arranged to adjust the height of the frame 20 relative to the support surface to accommodate dough lengths 15 of different thickness. The frame 20 includes side rails 22 spaced by cross members 23, 24 and 25. In the preferred embodiment a bearing support 28 depends from the cross member 23 in a longitudinal plane A—A (FIG. 2) perpendicular to the support surface 14 and carries a bearing 29 which jointly journals the adjacent ends of first and second drive shafts 30 and 31. Bearings 32 and 33 carried by the frame 20 respectively journal the other ends of these shafts.

The first drive shaft 30 may be driven by any suitable drive means, preferably by a rubber-surfaced friction wheel 35 engaging the support surface 14 of the conveyor to be turned thereby at a corresponding lineal speed. This friction wheel 35 is journalled on a pin 36 carried by the free end of an arm 37 having its other end pivoted about the drive shaft 30. A sprocket 39 is fixed to the friction wheel 35, a chain 40 connecting this sprocket to another sprocket 41 fixed to the first drive shaft 30. The friction wheel 35 engages the support surface 14 at a lateral position displaced from the area that is to receive the dough strips 15.

The first drive shaft 30 drives a narrow endless holding belt 44 encircling pulleys 45 and 46 respectively attached to the drive shaft 30 and to a first idler shaft 47 journalled in bearings 48 disposed in channels 49 of the frame 20. Belt-tightening screws 50 advance the bearings 48 along the channels 49 to tighten the holding belt 44. As best shown in FIG. 3, the holding belt has a forward run 52 and a return run 53 extending substantially in the forward direction indicated by the arrow 12. The forward run 52 is spaced substantially uniformly above the support surface 14 to provide a dough-receiving or dough-holding space 54. The drive for this holding belt is designed to move the forward run 52 at substantially the same lineal speed as the support surface 14 whereby a narrow end segment of a dough length 15 is received thereby and advanced at conveyor speed with little or no turning or twisting from a grasping position 55 to a release position 56. The bolts 21 are adjusted so that the height of the holding space 54 is only slightly less than the height of the dough strips 15 to be successively received at the grasping position 55.

Spaced laterally from the holding belt 44 and on the opposite side of the plane A—A therefrom is a first twisting belt 60 having forward and return runs 61 and 62 the former providing a first dough-twisting space 63 having grasping and release positions respectively opposite those of the holding belt 44. The twisting belt 60 encircles pulleys 65 and 66 the former being attached to the drive shaft 31 and the latter journalling freely on the first idler shaft 47.

A drive means is provided for the twisting belt 60 to move the forward run 61 thereof at a lineal speed differing from that of the support surface 14 of the conveyor. While this drive means can be associated with the friction wheel 35 I prefer to employ a variable speed electric motor 68 so that the speed of the twisting belt 60 can be varied readily. A switch 69 controls the energization of the motor. The motor 68 is mounted on the frame 20. Its shaft is journalled in a pillow block 70 and carries a sprocket 71 linked by a chain 72 to another sprocket 73 fixed to the drive shaft 31. It is preferred to drive the twisting belt 60 so that its forward run 61 advances faster than the support surface 14. Another end segment of a dough length 15 is thus received by the dough-twisting space 63 and rolled between the belt and the support surface. This twists the dough length in the area between the two belts.

A two-belt arrangement can be employed to twist dough lengths that are relatively short or of relatively large cross-section. However, with longer dough lengths it is desirable to add a second twisting belt 75 operating in a manner to provide separate twisting zones for the two halves of the dough length. Various arrangements are possible but in the preferred embodiment the belts are arranged to twist the halves sequentially. The drawings exemplify the invention as applied to this sequence.

The second twisting belt 75 is illustrated as positioned between the belts 44 and 60 but on the same side of the plane A—A as the latter. It encircles pulleys 76 and 77 respectively secured to the drive shaft 31 and to a shaft 78 journalled in bearings 79 positioned in channels of the frame and equipped with belt-tightening screws 80 similar to those previously described. The twisting belt 75 provides forward and return runs 82 and 83 the former being spaced above the support surface 14 to provide a second dough-twisting space 84. In the preferred arrangement this dough-twisting space is shorter than the dough-holding space 54 or the dough-twisting space 63; also the second twisting belt moves at the same lineal speed as the first twisting belt. In the simplest and preferred structure the grasping position of all three dough spaces 54, 63 and 84 are laterally opposite or in alignment with the dough strips 15 as they are received whereby three spaced narrow segments of each dough strip simultaneously enter the corresponding dough spaces. With the arrangement shown, however, the release position for the dough twisting space 84 is disposed ahead of the release positions of the holding space 54 and twisting space 63 due to the shorter length of the second twisting belt 75.

The sequential twisting of the halves of the dough length effected by the complete machine is best shown diagrammatically in FIGS. 5-10. If a dough strip shaped substantially as in FIG. 8 reaches the three grasping positions substantially simultaneously, as suggested by the dotted lines 90 of FIG. 5, one end segment will advance forwardly at conveyor speed without substantial turning while retained in the dough-holding space 54. Assuming that the lineal speed of the support surface 14 and the forward run of the belt 44 is represented by X ft./min. and the lineal speeds of the forward runs of the belts 60 and 75 are 2x, the central narrow segment of the dough length will be rolled and advanced from position $a$ to position $c$ during a time that the end segment moves from position $a$ to position $b$, resulting in a twisting in the half 91 of the dough strip that is in the space between the belts 44 and 75. At the same time, the half 92 of the dough strip rolls as a unit from position $a$ to position $c$ and remains transverse to the conveyor 10 because its ends are respectively in the dough spaces 63 and 84. The initial twisting of one half of the dough strip is represented diagrammatically in FIG. 9.

As soon as the central segment of the half-twisted dough strip reaches the release position of the space 84 the half 92 starts to twist as suggested in FIG. 6 which shows the dough length at an intermediate position. Little or no additional twisting of the half 91 takes place at this time. When the end segment of the dough strip reaches the release position of the dough-twisting space 63, suggested at position $d$ in FIGS. 5-7, it is carried forward by the conveyor for an instant until the first-mentioned end of the dough strip reaches the release position of the dough-holding space 54. This position of the twisted dough strip is shown in FIG. 7 and the dough strip with both halves twisted is suggested in FIG. 10. It will usually be released in a position not at right angles to the direction of movement of the conveyor, as suggested in FIG. 7, being displaced in the twisting operation from its initial transverse position on the conveyor.

This type of sequential twisting of a dough length has been found to be particularly effective. The twisting action takes place in unconfined spaces between the belts, giving a twist that is not flattened or deformed by confining elements and which is particularly desirable in the making of coffee cakes or other baked products in which the twisted configuration is particularly desired. It is also a feature of the invention that the sequentially received dough lengths will be individually twisted without danger of coming into contact with each other and fouling the machine. The twisting action tends to maintain or increase the separation of corresponding segments of sequentially received dough strips.

The belts 44, 60 and 75 are preferably made of materials best suited to their respective functions. For example, the holding belt 44 is preferably made of canvas while the twisting belts 60 and 75 are preferably made of rubber. These twisting belts may have roughened or transversely ridged surfaces to aid the twisting function. The main conveyor belt may be of any conventional material, typically a rubber composition.

It should be understood that the above example in which the lineal speeds of the belts 60 and 75 are twice that of the belt 44 is merely arbitrary and exemplary. The speeds of the belts 60 and 75 will be varied to give the desired twist to the dough length. The lineal speeds of the belts 60 and 75 are usually equal but this is not essential. If they advance at different speeds the dough half 92 will receive an initial twist before reaching the position shown in FIG. 5. Nor is it essential that the holding belt 44 have a lineal speed exactly the same as the support surface 14. If they move at different speeds the twisting action in the half 91 can be increased or decreased in reaching the position of FIG. 5. The same is true during twisting of the dough as positioned in FIG. 6. Finally, it is not always essential to the invention that one of the end belts be driven at a slower or different speed as compared with the belts 60 or 75. If the central belt moves slower than the end belts, for example, the halves of each dough length will be simultaneously twisted and the twisted product may discharge in V form. The same is true if the central belt advances faster than the end belts, being then constructed so that its forward run is longer than those of the end belts.

In general, the invention is not limited to end belts having longer forward runs than the intermediate belt. Nor is it limited to a plurality of belts forming dough spaces in which the grasping portions are laterally opposite. Furthermore it is not essential that each dough length be positioned on the conveyor so that its spaced segments enter simultaneously the dough spaces at the respective grasping positions.

Various changes and modifications can be made without departing from the spirit of the invention as defined in the appended claims.

I claim as my invention:

1. A dough twisting machine adapted to twist each of a succession of lengths of dough positioned laterally on a conveyor having a support surface moving in a forward direction, said dough twisting machine including: a narrow endless holding belt having forward and return runs; means for mounting said holding belt with its forward run facing said support surface and for advancing said forward run in said forward direction from a grasping position to a release position while spaced from said support surface a distance slightly less than the thickness of each dough length to form a dough-receiving space receiving a narrow first segment of said dough length; a narrow endless twisting belt having forward and return runs; means for mounting said twisting belt at a location spaced laterally from said holding belt a distance equal at least to the combined widths of the holding and twisting belts with its forward run facing said support surface and with its forward run spaced from said support surface a distance slightly less than such thickness of each dough length in a path from a grasping position to a release position to form a dough-twisting space conveying a narrow second segment of such dough length forwardly; and drive means for advancing said forward run of said twisting belt in said forward direction at a lineal speed different from that of said holding belt and said support surface to roll said second segment and twist the section of the dough length lying between said segments.

2. A dough twisting machine as defined in claim 1 in which said advancing means includes means advancing said forward run of said holding belt in said forward direction at substantially the same lineal speed as said support surface.

3. A dough twisting machine as defined in claim 1 including a traction wheel having a circular tread positioned to engage said support surface to one side of an article-conveying zone thereof to be driven by said support surface, and means operatively connecting said traction wheel to drive at least one of said endless belts.

4. A dough twisting machine as defined in claim 3 in which said connecting means operatively connects said traction wheel and said advancing means for said holding belt, said drive means for said twisting belt including an electric motor and means for operatively connecting same to said twisting belt to drive same at said different lineal speed.

5. A dough twisting machine adapted to twist each of a succession of lengths of dough positioned laterally on a conveyor having a support surface moving in a forward direction, said dough twisting machine including: a narrow endless holding belt having forward and return runs; means for mounting said holding belt with its forward run facing said support surface and for advancing its forward run in said forward direction from a grasping position to a release position while spaced from said support surface a distance slightly less than the thickness of each dough length to form a dough-receiving space receiving a narrow first segment of said dough length; a narrow endless twisting belt having forward and return runs; means for mounting said twisting belt at a location spaced laterally a substantial distance from said holding belt with its forward run facing said support surface and with its forward run spaced from said support surface a distance slightly less than such thickness of each dough length in a path from a grasping position to a release position to form a dough-twisting space conveying a narrow second segment of such dough length forwardly; a second narrow endless twisting belt having forward and return runs; means for mounting said second twisting belt between and spaced laterally from said holding belt and said first named twisting belt with its forward run facing said support surface and with its forward run spaced from said support surface a distance slightly less than the thickness of each dough length from a grasping position to a release position to form a second dough-twisting space conveying a narrow third segment of such dough length forwardly to its release position, the length of at least one of said forward runs between grasping and release positions being different from the length of at least one of the other forward runs whereby the operational functions of said forward runs terminate at different positions; and drive means for advancing the forward runs of each of said twisting belts in said forward direction at lineal speeds different from the respective lineal speeds in said forward direction of said holding belt and said support surface.

6. A dough twisting machine including in combination: a conveyor having a support surface; means for advancing said support surface to move in a forward direction from a dough-receiving area to a processed-dough area; three endless belts having respective forward runs facing and spaced respectively above said support surface at laterally spaced locations and extending in said forward direction, each belt being spaced from its neighbor a distance greater than the width of any of said belts, there being a dough-receiving space between said support surface and each of said forward runs; and drive means for said endless belts driving said forward runs thereof in said forward direction and driving at least one of said forward runs in said forward direction at a lineal speed substantially different from that of said support surface.

7. A dough twisting machine as defined in claim 6 in which said drive means includes means for driving one of said forward runs in said forward direction at substantially the same lineal speed as the speed of said support surface in said forward direction, said drive means including means for driving each of the other forward runs in said forward direction at a lineal speed that is substantially different from the speed of said support surface in said forward direction.

8. A dough twisting machine as defined in claim 7 in which said drive means includes means for driving each of said other forward runs in said forward direction at substantially the same lineal speed relative to the lineal speed of said support surface.

9 A dough twisting machine as defined in claim 7 in which two of said forward runs and their respective dough-receiving spaces are of longer length than the third of said forward runs and its dough-receiving space whereby the latter terminates its operational function prior to the other two.

10. A dough twisting machine including in combination: a conveyor having a support surface advancing in a forward direction from a dough-receiving area to a processed-dough area; a trinity of narrow belts having respective forward runs spaced laterally above said support surface and extending in said forward direction to provide a trinity of dough-receiving spaces between said forward runs of said belts and said support surface; drive means for driving one of said belts to advance its forward run in said forward direction at a lineal speed substantially equal to that of said support surface; and drive means for driving the remaining two belts to advance their forward runs in said forward direction at a lineal speed different from that of said support surface, the lengths of said two remaining forward runs being longer than said one forward run whereby the operational function of the latter terminates prior to those of said two remaining forward runs.

11. A dough twisting machine including in combination: a conveyor having a support surface advancing in a forward direction from a dough-receiving area to a processed-dough area; a dough-holding means including two pulleys aligned substantially in said forward direction and positioned to one side of a longitudinal plane perpendicular to said support surface, said two pulleys being mounted to turn about parallel axes, and a narrow endless holding belt encircling said pulleys having a forward run facing and spaced above said support surface to form a dough-holding space; a first dough-twisting means including two pulleys aligned substantially in said forward direction on the other side of said longitudinal plane mounted to turn about parallel axes, and a first narrow endless twisting belt encircling such two pulleys having a forward run facing and spaced above said support surface to form a first dough-twisting space therebetween; a second dough-twisting means including two pulleys aligned substantially in said forward direction on said other side of said longitudinal plane mounted to turn about parallel axes, and a second narrow endless twisting belt encircling such two pulleys having a forward run facing and spaced above said support surface to form a second dough-twisting space therebetween; drive means driving said holding belt to move its forward run in said forward direction at substantially the same lineal speed as said support surface; and drive means driving said first and second twisting belts to move their respective forward runs in said forward direction at lineal speeds different from that of said support surface.

12. A dough twisting machine as defined in claim 11 in which one of said twisting belts is substantially shorter than said holding belt and the other twisting belt whereby the operational function of said shorter twisting belt terminates prior to those of said holding belt and said other twisting belt.

13. A dough twisting machine including in combination: a conveyor having a support surface advancing in a forward direction from a dough-receiving area to a processed-dough area; a frame above said support surface; two drive shafts and bearings supported by said frame journalling said shafts in end-to-end relation to turn about a common axis substantially perpendicular to said forward direction; a first idler shaft and bearings supported by said frame journalling same to turn about an axis spaced forwardly of said common axis; a second idler shaft and bearings supported by said frame journalling same to turn about a second axis spaced between said first axis and the position of said common axes; pulleys mounted respectively on one of said drive shafts and said first idler shaft and a narrow holding belt encircling said pulleys having a forward run facing and spaced above said support surface to form a dough-holding space; pulleys mounted respectively on the other drive shaft and said first idler shaft and a first narrow twisting belt encircling such pulleys having a forward run facing and spaced above said support surface to form a first dough-twisting space; pulleys mounted respectively on said other drive shaft and said second idler shaft and a second narrow twisting belt encircling such pulleys having a forward run facing and spaced above said support surface to form a second dough-twisting space; drive means for driving said one drive shaft to advance said forward run of said holding belt in said forward direction at a lineal speed substantially equal to that of said support surface; and drive means for driving said other drive shaft to advance said forward runs of said twisting belts in said forward direction at a lineal speed greater than that of said support surface.

14. A dough twisting machine as defined in claim 13 in which said first-named drive means includes a traction wheel, means for mounting same on said frame in a position to engage said support surface in a zone to one side of an article-conveying zone of such support surface, and means operatively connecting said traction wheel to said one drive shaft.

15. A dough twisting machine as defined in claim 14 in which the other of said drive means includes an electric motor driving said other drive shaft independent of said one drive shaft.

16. A dough twisting machine as defined in claim 13 in which said forward runs of said holding belt and said first twisting belt are substantially longer than the forward run of said second twisting belt whereby the operational function of the latter terminates prior to that of said holding belt and said first twisting belt, said second twisting belt being positioned between such holding belt and said first twisting belt.

References Cited in the file of this patent

UNITED STATES PATENTS

| | | |
|---|---|---|
| 1,906,847 | Fitzgerald | May 2, 1933 |
| 1,929,919 | Ekstedt | Oct. 10, 1933 |
| 2,259,476 | MacManus | Oct. 21, 1941 |
| 2,657,648 | Sawyer et al. | Nov. 3, 1953 |
| 2,704,892 | Rhodes | Mar. 29, 1955 |